(12) United States Patent
Taylor et al.

(10) Patent No.: US 7,943,040 B2
(45) Date of Patent: May 17, 2011

(54) WASTEWATER TREATMENT AND RECYCLING SYSTEM

(75) Inventors: Shannon L. Taylor, Vancouver, WA (US); Richard W. Frederick, Vancouver, WA (US); Bernie L. Larson, Vancouver, WA (US); Paul W. Linton, Camas, WA (US)

(73) Assignee: Karcher North America, Inc., Englewood, CO (US)

( * ) Notice: Subject to any disclaimer, the term of this patent is extended or adjusted under 35 U.S.C. 154(b) by 443 days.

(21) Appl. No.: 12/047,213

(22) Filed: Mar. 12, 2008

(65) Prior Publication Data

US 2009/0065442 A1 Mar. 12, 2009

Related U.S. Application Data

(60) Provisional application No. 60/906,664, filed on Mar. 12, 2007.

(51) Int. Cl.
*C02F 1/463* (2006.01)
*C02F 1/56* (2006.01)
*C02F 1/78* (2006.01)

(52) U.S. Cl. ........... 210/167.3; 210/167.31; 210/167.32; 210/182; 210/192; 210/195.1; 210/195.3; 210/199; 210/202; 210/205; 210/521; 204/660

(58) Field of Classification Search .............. 210/167.3
See application file for complete search history.

(56) References Cited

U.S. PATENT DOCUMENTS

| | | |
|---|---|---|
| 1,602,105 A | 10/1926 | Geer et al. |
| 2,765,997 A | 10/1956 | Motts |
| 3,064,486 A | 11/1962 | Aplin |
| 3,652,044 A | 3/1972 | Manross |
| 3,831,849 A | 8/1974 | Studinger |

(Continued)

FOREIGN PATENT DOCUMENTS

CA 2298122 A1 7/2001

OTHER PUBLICATIONS

Danron Enterprises, Electro-Coagulation Treatment (ECT) System Technology Fact Sheet, http://www.etvcanada,ca/F/data/PDF_Danron.pdf (Mar. 2006, visited Apr. 6, 2007).

(Continued)

*Primary Examiner* — Peter A Hruskoci
(74) *Attorney, Agent, or Firm* — Sheridan Ross P.C.

(57) ABSTRACT

A system and process for removing contaminants from wastewater where the wastewater is treated into a cleaned water that can be reused or discharged into the environment. The wastewater is transported through purification sections, depending on the system including several of the following: pre-treatment via screening and weirs to remove debris and certain heavy solids; a second pretreatment via a sump; strainer; conductivity solution injection system and electrolytic coagulation system; polymer injection system; inline mixers for mixing the polymer in the wastewater stream; retention tubes for providing residence time for the polymer to react in the wastewater stream; a multi-stage separation system comprised of a plurality of water separation compartments for consecutively separating contaminants from the wastewater stream by removing contaminants that float and heavy contaminants that settle to the bottom; and an ozone treatment system. Except for the pretreatment sections, each of the treatment sections are contained within an enclosure cabinet that includes controller and control panels as well and feed containers for the conductivity fluid and polymer.

12 Claims, 6 Drawing Sheets

U.S. PATENT DOCUMENTS

| | | | |
|---|---|---|---|
| 3,834,657 A | | 9/1974 | Freitas, Jr. |
| 3,858,761 A | | 1/1975 | O'Dell |
| 3,908,941 A | | 9/1975 | Bromley et al. |
| 3,923,658 A | * | 12/1975 | Lancaster ............... 210/108 |
| 4,120,210 A | | 10/1978 | Sloyan |
| 4,246,982 A | | 1/1981 | Pretnick |
| 4,306,967 A | | 12/1981 | Trautwein |
| D263,037 S | | 2/1982 | Brown |
| 4,355,834 A | | 10/1982 | Alford |
| 4,367,145 A | * | 1/1983 | Simpson et al. ............ 210/241 |
| 4,431,548 A | * | 2/1984 | Lipowski et al. ........... 210/732 |
| D276,902 S | | 12/1984 | Plugge |
| 4,561,624 A | | 12/1985 | Freeman |
| 4,652,368 A | * | 3/1987 | Ennis et al. ............... 210/97 |
| 4,792,274 A | | 12/1988 | Cockram |
| 5,031,602 A | | 7/1991 | Vick |
| D329,996 S | | 10/1992 | Ciszewski |
| 5,286,302 A | | 2/1994 | Wickham, III |
| 5,413,128 A | | 5/1995 | Butts |
| 5,445,730 A | * | 8/1995 | Pattee ................. 210/167.31 |
| 5,498,329 A | * | 3/1996 | Lamminen et al. ........... 210/86 |
| 5,601,659 A | | 2/1997 | Rohrbacher |
| 5,611,487 A | | 3/1997 | Hood |
| 5,695,121 A | | 12/1997 | Stillions, Jr. et al. |
| 5,746,904 A | * | 5/1998 | Lee ....................... 205/757 |
| 5,833,295 A | | 11/1998 | Farlow, Jr. |
| 5,908,550 A | * | 6/1999 | Kaipainen ................ 210/167.3 |
| 5,958,240 A | * | 9/1999 | Hoel ...................... 210/608 |
| 5,975,480 A | | 11/1999 | Schaefer et al. |
| 6,021,792 A | | 2/2000 | Petter et al. |
| 6,042,702 A | | 3/2000 | Kolouch et al. |
| 6,106,712 A | | 8/2000 | New |
| 6,132,509 A | | 10/2000 | Kuschnereit |
| 6,132,599 A | | 10/2000 | Chaffee |
| 6,234,408 B1 | | 5/2001 | Stevens et al. |
| 6,234,409 B1 | | 5/2001 | Aslakson |
| 6,301,848 B1 | | 10/2001 | Whitaker |
| 6,346,197 B1 | * | 2/2002 | Stephenson et al. .......... 210/704 |
| 6,349,715 B1 | | 2/2002 | McBroom |
| 6,416,101 B1 | | 7/2002 | Bartch |
| 6,495,048 B2 | | 12/2002 | Stephenson et al. |
| 6,550,692 B1 | | 4/2003 | Schacht |
| 6,575,858 B2 | | 6/2003 | Green et al. |
| 6,641,721 B2 | * | 11/2003 | Mullerheim ............... 210/173 |
| 6,655,396 B2 | * | 12/2003 | Krenzel ................. 134/104.1 |
| 6,663,783 B2 | | 12/2003 | Stephenson et al. |
| 6,715,517 B2 | | 4/2004 | Tobin |
| 6,766,822 B2 | | 7/2004 | Walker |
| 6,790,349 B1 | * | 9/2004 | Sawyer .................... 210/173 |
| 6,799,591 B2 | | 10/2004 | McCormick et al. |
| 6,932,412 B1 | | 8/2005 | Paproski |
| D510,545 S | | 10/2005 | Riegel et al. |
| 6,964,820 B2 | | 11/2005 | Shimonosono et al. |
| 7,066,096 B1 | | 6/2006 | Harker et al. |
| 7,118,633 B2 | | 10/2006 | Jenkins |
| 7,121,288 B2 | | 10/2006 | Jenkins |
| 7,203,979 B2 | | 4/2007 | O'Brien |
| 7,258,749 B2 | | 8/2007 | McCormick et al. |
| D555,303 S | | 11/2007 | Taylor et al. |
| D566,624 S | | 4/2008 | Dempsey et al. |
| D572,212 S | | 7/2008 | Taylor et al. |
| 7,431,835 B2 | * | 10/2008 | Lack ...................... 210/205 |
| 7,530,362 B2 | * | 5/2009 | McCormick et al. ......... 134/123 |
| 7,775,221 B2 | | 8/2010 | Zeile |
| 2004/0099599 A1 | | 5/2004 | Van Vliet et al. |
| 2006/0118149 A1 | | 6/2006 | Benson et al. |
| 2006/0273622 A1 | | 12/2006 | Laird |
| 2007/0056510 A1 | | 3/2007 | Antaya |
| 2008/0000507 A1 | | 1/2008 | Snyder et al. |
| 2009/0062046 A1 | | 3/2009 | Lindemann |

OTHER PUBLICATIONS

Sheree DiTerlizzi, Introduction to Coagulation and Flocculation of Wastewater, http://www.rpi.edu/dept/chem-eng/Biotech-Environ/COAG/coag.htm (Fall 1994, visited Apr. 6, 2007).

Hydropad Portable Wash Pad, http://www.ecosentry.com.au/hydropad, pp. 1-3 (visited Aug. 10, 2006).

Hydropad Portable Wash Pad, http://www.hydroblaster.com/HydropadPortableWashRack.html, pp. 1-11 (visited Aug. 10, 2006).

EZ Environmental Solutions Corp.—Drive-On Wash Pad, http://www.ezenvironmental.com/product.asp?page=1224, pp. 1-3 (visited Aug. 10, 2006).

Cyclonator—Closed Loop Washrack System, http://www.megator.com/cyclonator.htm, pp. 1-2 (visited Aug. 10, 2006).

Taylor et al., U.S. Appl. No. 29/260,139, filed May 18, 2006 for Equipment Control Cabinet for Wash Station or the Like[1].

Taylor et al., U.S. Appl. No. 12/032,562, filed Feb. 15, 2008 for Wash Pad and Wash Fluid Containment System.

Oil Trap Inc., Washwater Treatment ElectroPulse Technology, Recycling Product News, Jul./Aug. 2005.

Official Action for Canadian Patent Application No. 2,584,947, dated Jul. 16, 2010.

* cited by examiner

WASTEWATER TREATMENT AND RECYCLING SYSTEM

RELATED APPLICATION DATA

This application claims priority to provisional application No. 60/906,664 filed Mar. 12, 2007 hereby incorporated by reference.

BACKGROUND

The field of the present disclosure is directed to wash fluid containment and fluid treatment systems such as used for treating and recycling fluids.

In certain environments there is a need to wash vehicles, trailers and various equipment. It is desirable to contain the wastewater fluids from washing activities and treat these fluids for recycling and reuse.

The present inventors have recognized various limitations in the prior systems and the desirability for an improved system.

BRIEF DESCRIPTION OF THE DRAWINGS

FIG. 3A is a detailed view of the sludge separator of the system of FIG. 1.

Figure 1:
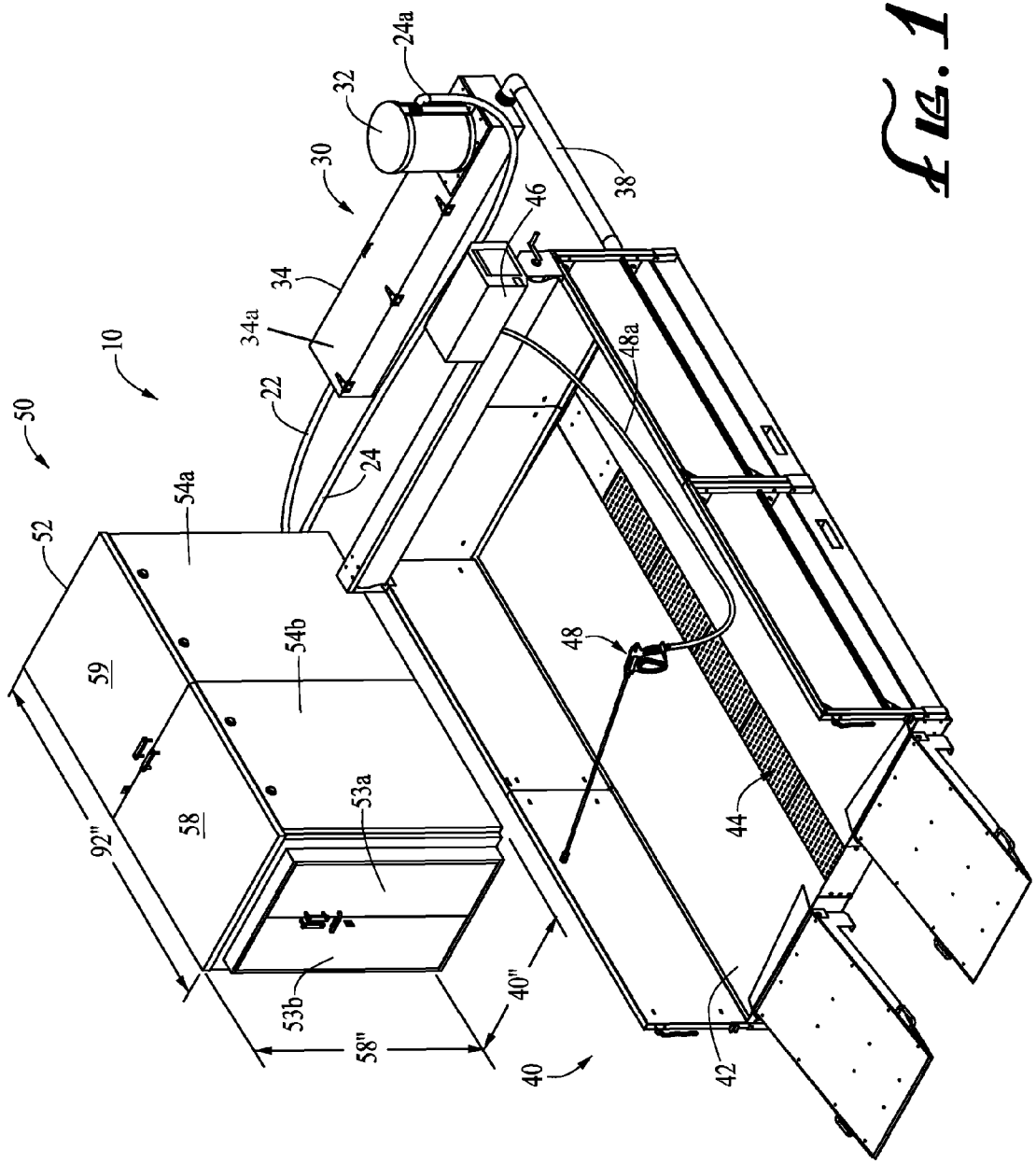
FIG. 1 is a front top perspective view of a wash fluid containment and water treatment system according to a preferred embodiment.

Additional aspects and advantages will be apparent from the following detailed description of preferred embodiments, which proceeds with reference to the accompanying drawings.

DETAILED DESCRIPTION OF PREFERRED EMBODIMENTS

Preferred embodiments will now be described with reference to the drawings. To facilitate description, any element numeral representing an element in one figure will represent the same element in any other figure.

FIGS. 1-4 illustrate a combined system 10 for a wash water containment and water treatment system according to a preferred embodiment. The combined system 10 includes a wash pad 40, a sump 30, and a water treatment system 50. A vehicle or other piece of equipment to be washed may be moved or driven onto the wash pad 40. As the equipment is washed via the pressure washer 48, wastewater is directed inwardly by the sloped surfaces of the wash pad sections 42, collected via central trench 44, and then transferred via a hose or pipe 38 to the sump 30. The sump 30 comprises a sludge tank/separator 32 and a trench section 34 including a weir 35. The wastewater entering the trench section 34 from the pipe 38 must pass over the weir 35 in the trench section 34 and thereafter enters the treatment system 50 via hose 22. The trench section 34 of the sump 30 has a hinged cover 34a that may be pivoted open to provide access to the inside enabling removal of debris/solids collected by the weir. Recycled/treated water from the system 50 is returned to the wash pad area via line 92 for use by the pressure washer 48. Sludge waste from the treatment system 50 is purged into the tank 32 via hose 24. The tank 32 filters/separates the sludge waste from the water, the water passing through and into the sump trench 34. The sludge waste may be manually removed from the tank 32.

The water treatment system 50 includes an enclosure or cabinet 52 that houses/encloses the various system components. The cabinet 52 is drawn generally to scale to itself but at a slightly enlarged scale relative to the wash pad. The size dimensions for the cabinet 52 are illustrated in FIG. 1, namely 92 inches (230 cm) long by 40 inches (100 cm) wide by 58 inches (150 cm) high, these dimensions constituting a preferred size of cabinet. The cabinet 52 includes: removable upper doors 58, 59; removable side panels 54a, 54b (two side panels on each lateral side); hinged front doors 53a, 53b; and removable rear panel. The water treatment system 50 and cabinet 52 enclosing the system are sized to be movable, such as by a forklift, the system having a capacity for treating wastewater from a wash pad sized for washing vehicles such as automobiles or pickups and various rental equipment.

Figure 2:
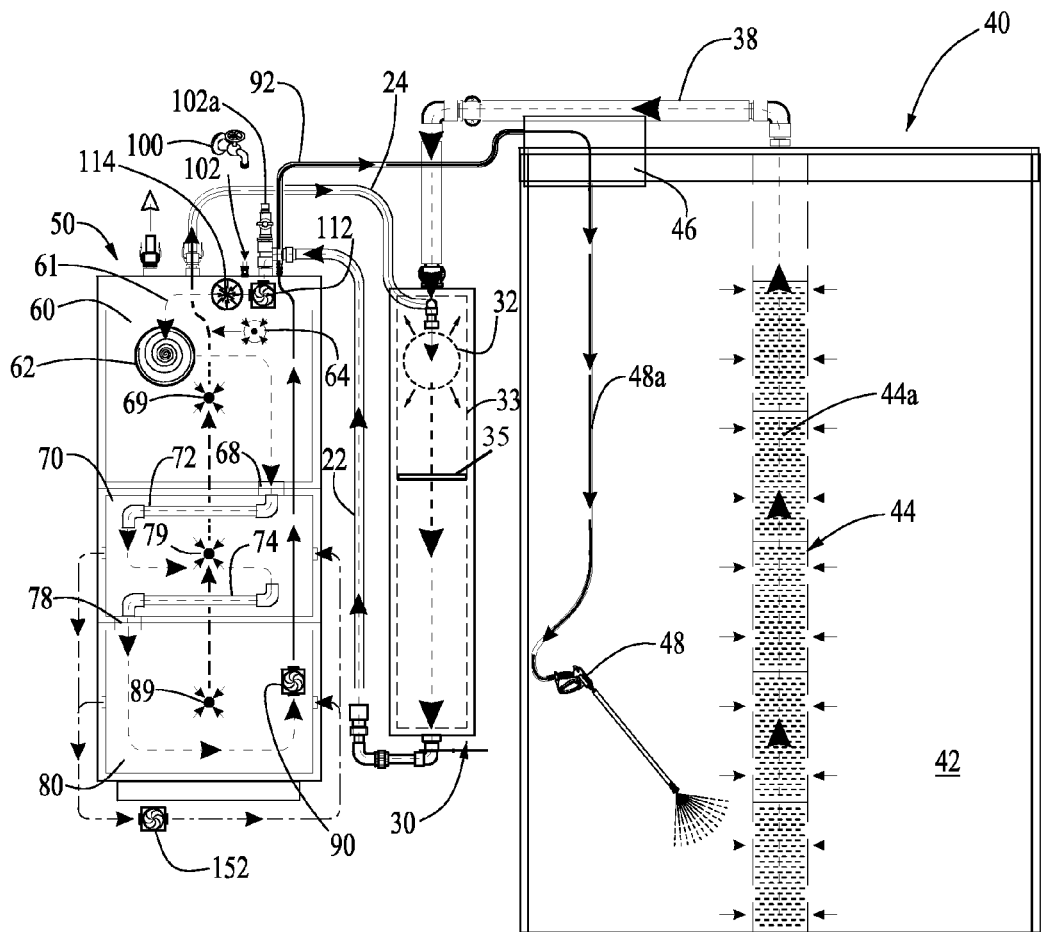
FIG. 2 is a process diagram of the wash fluid containment and water treatment system of FIG. 1.
Figure 3:
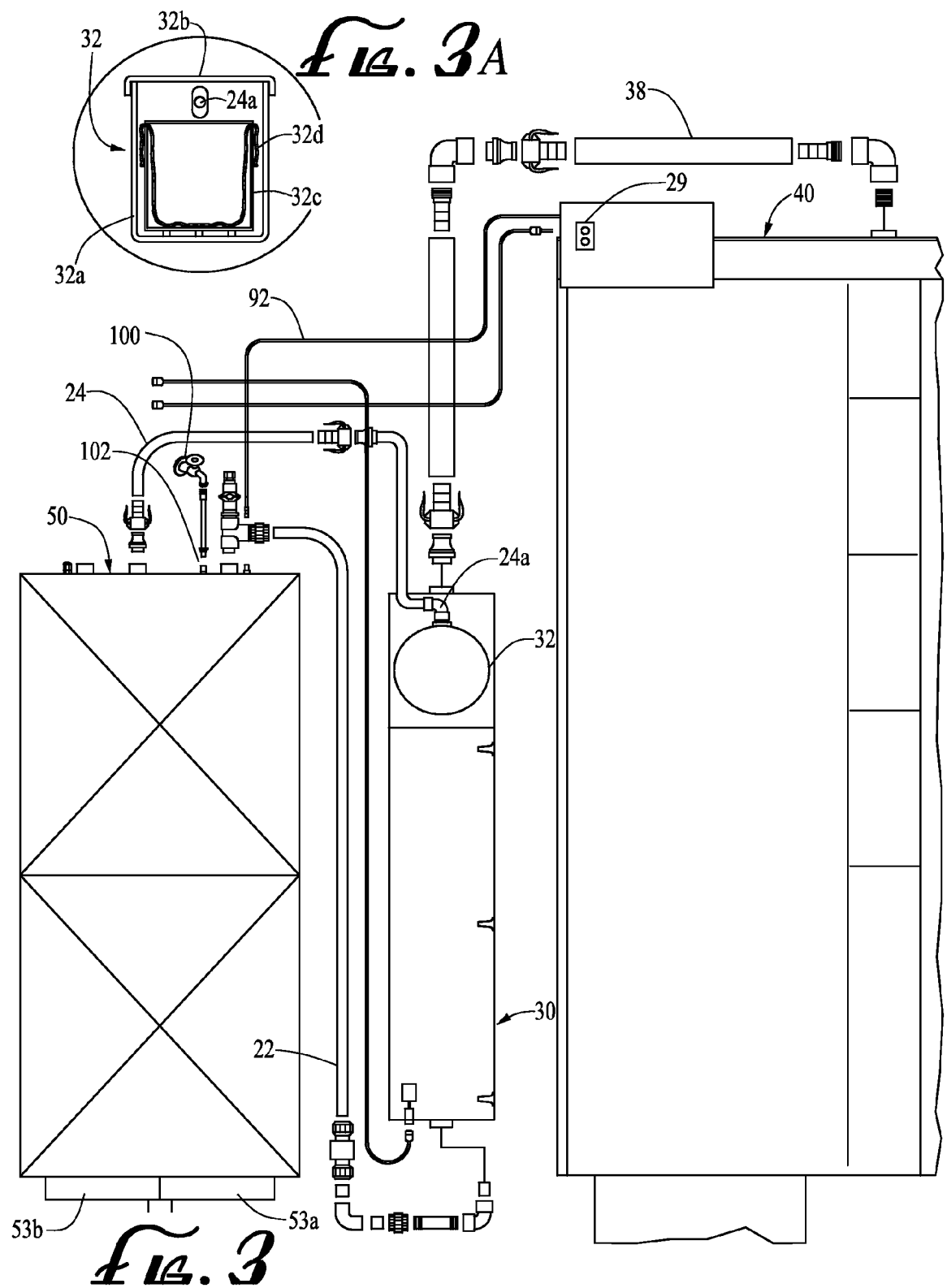
FIG. 3 is a top plan view of the wash fluid containment and water treatment system of FIG. 1 with the sump section positioned along a lateral side of the wash pad.

Further details of the wash pad 40 are described in U.S. patent application Ser. No. 12/032,562 filed Feb. 15, 2008 hereby incorporated by reference. In a preferred configuration, the trench 44 is reversible. Depending on the orientation of the trench 44, wastewater may be drained either forwardly or rearwardly for connection to the sump hose 38. FIGS. 1-3 illustrates the trench 44 oriented for drainage in the rearward direction connected by the pipe 38 to the sump 30.

The wash pad assembly 40 may also include an integrated pressure washer system comprised of a hose reel and housing assembly 46 and pressure washer assembly 48. The pressure washer assembly 48 includes a trigger valve mechanism, a wand and nozzle attached to a water source by a hose 48a. The hose 48a is wound onto a hose reel that is disposed within the hose reel housing 46. The hose reel housing 46 may be located either on the right side of the wash pad (as shown in FIG. 1) or on the left side (as shown in FIGS. 2-3).

A grating 44a is installed over the trench 44 between the left and right wash pad sections 42. The grating 44a has perforations for allowing the water flowing downward from the wash pad sections 42 to pass therethrough and into the trench 44. The perforations are preferably of a desired size large enough to allow for passage of the water into trench 44, but small enough to prevent passage of larger size debris. Such debris may then be removed from the pad by sweeping or other manual collection. Under the grating 44a, the trench 44 includes two weirs and a screen (not shown) disposed near the exit end of the trench 44 such that water must pass over the weirs and through the screen whereby some debris and heavy solids are inhibited from reaching the exit pipe 38.

The wastewater from the trench 44 then passes via pipe 38 to the sump 30. The sump 30 comprises a sludge separator 32 and a holding tank 33 including a weir (not shown). The wastewater from pipe 38 must pass over the weir in the holding tank 33, the weir capturing certain debris and heavy solids, and the wastewater thereafter is transferred to the treatment system 50 via hose 22. Recycled/treated water from the treatment system 50 is returned to the wash pad area for use by the pressure washer assembly 48. Sludge waste from the treatment system 50 is purged into the sludge separator 32 via hose 24 through fitting 24a. The sludge separator 32 includes an outer tank 32a with a top lid 32b. Inside the tank 32a is a bucket-shaped filter screen 32c that filters/separates the sludge waste and other particulates from the water, the water passing through the filter and into the holding tank 33. A fabric filter 32d is disposed in the filter screen 32c to provide enhanced particle removal. The sludge waste (which may be referred to as solids) may be manually removed from both the holding tank 33 and the filter screen 32c. The fabric filter 32d is typically a disposable element.

Thus even before reaching the water treatment system 50, the wastewater has undergone three processes for removing debris and solids namely: (a) grating 44a, (b) the trench 44 (via the weirs and screen) and (c) the sump 30.

Figure 4:
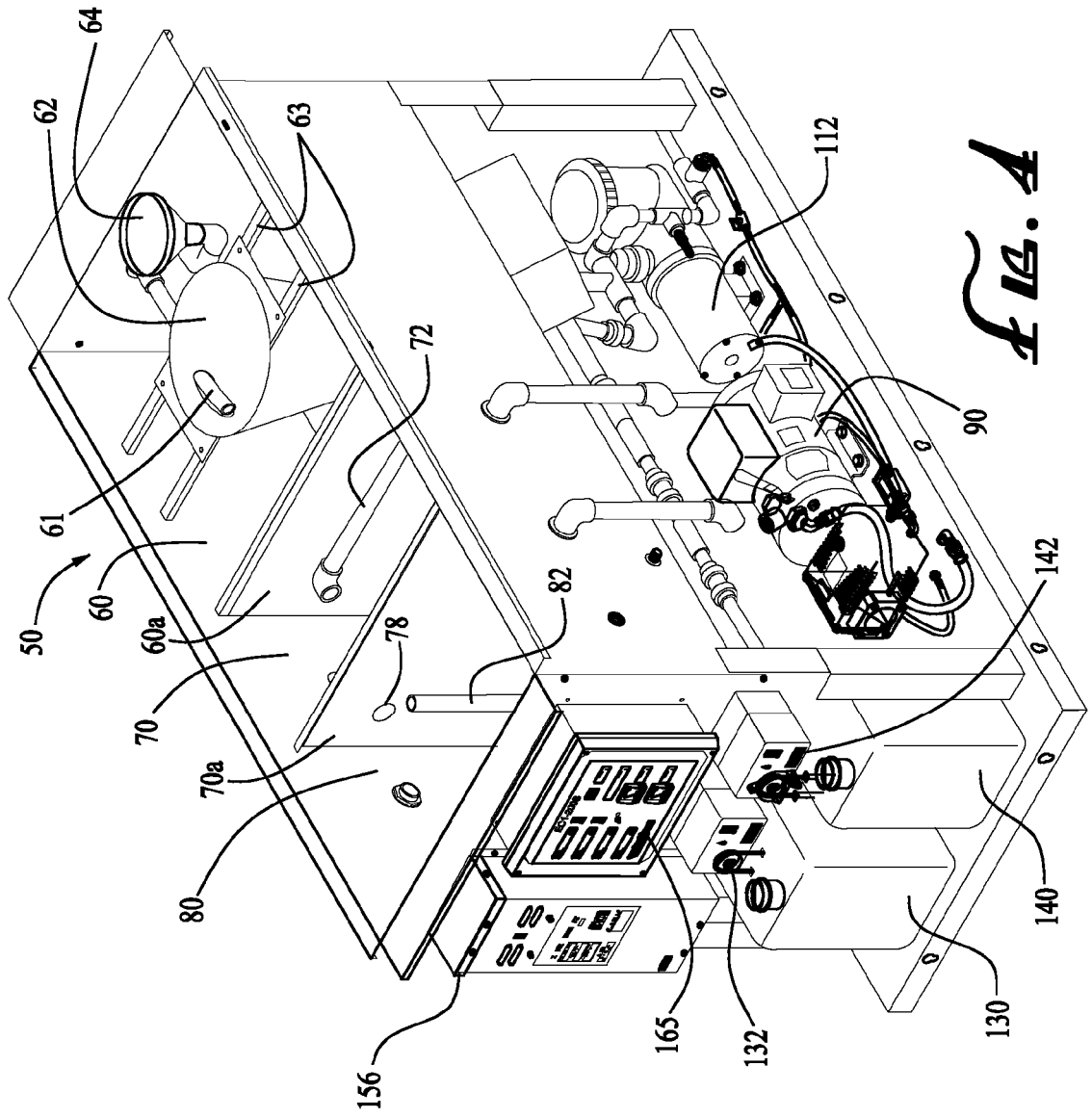
FIG. 4 perspective view of the water treatment system of FIGS. 1-3 with certain panels removed to expose internal components.
Figure 5:
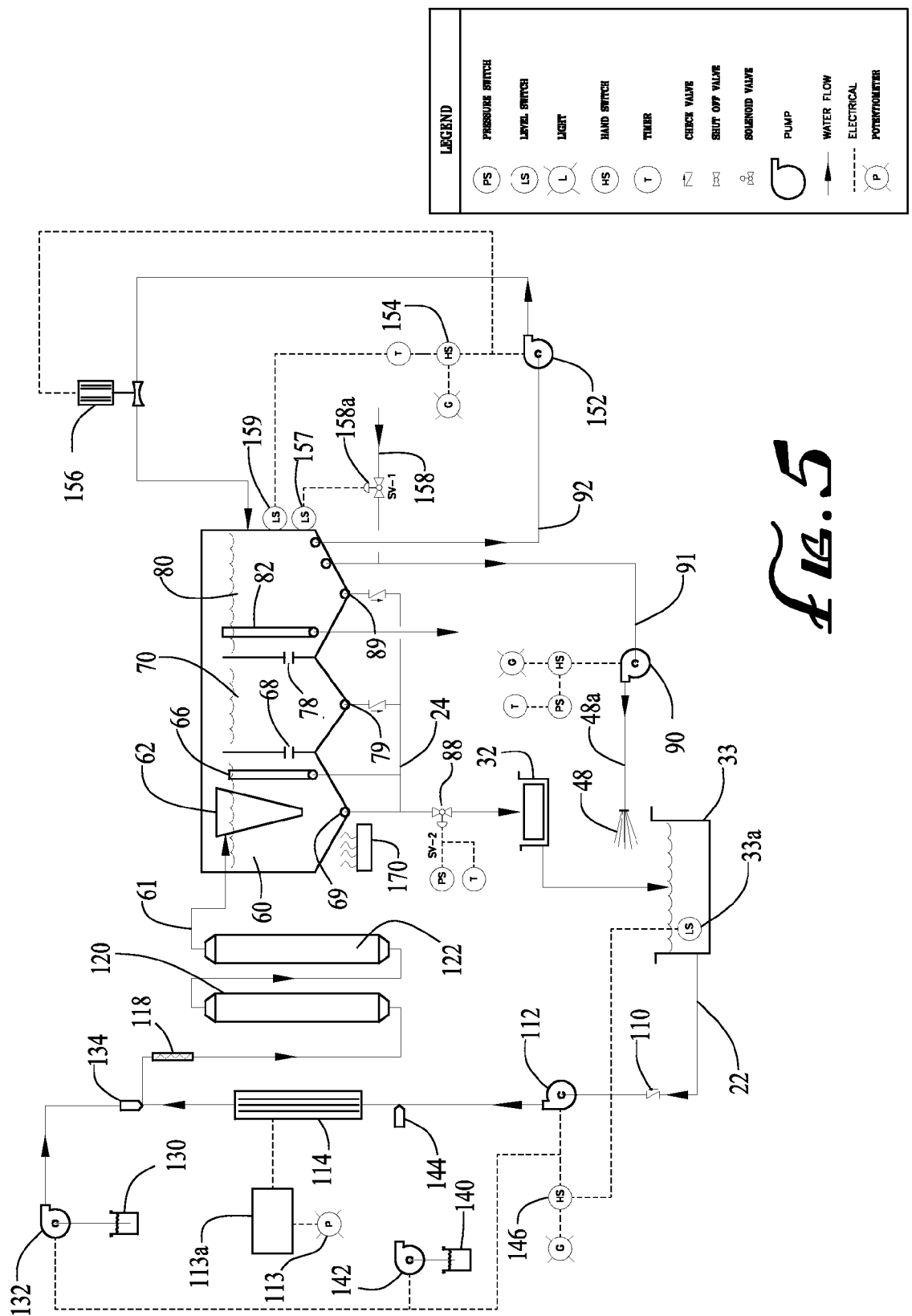
FIG. 5 is schematic diagram of a preferred wash fluid treatment process for the wash fluid containment and water treatment system of FIG. 1.
Figure 6:
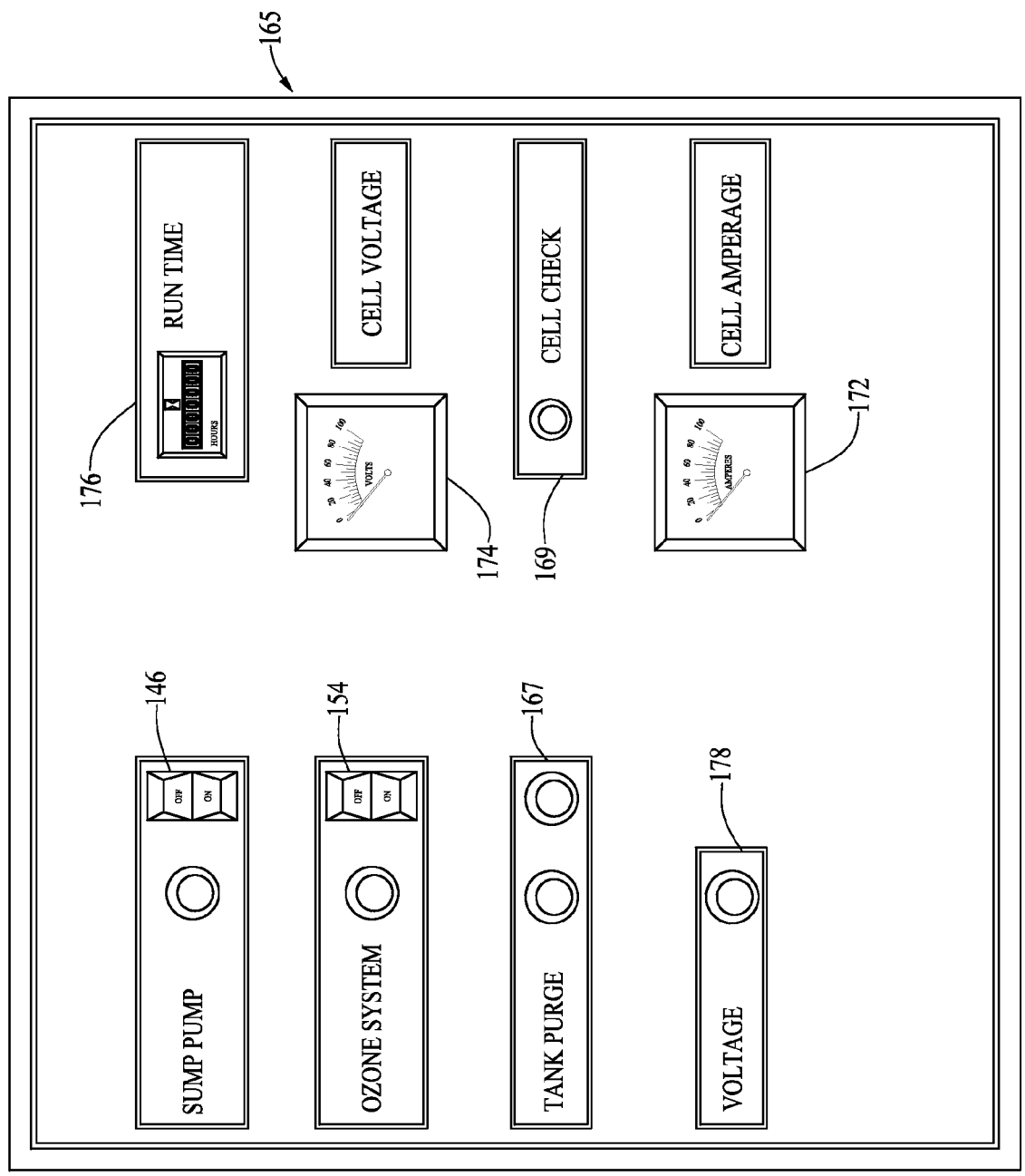
FIG. 6 is a front elevation view of the control panel of the water treatment system of FIG. 1.

Details of the water treatment process will now be described with particular reference the perspective view of the water treatment system of FIG. 4, the schematic diagram of FIG. 5, and the process diagram of FIG. 2. Wastewater in the holding tank 33 is pumped via pump 112 into the treatment system via piping 22. A level switch 33a is disposed within the holding tank 33 providing a signal to a controller pertaining to the water level within the holding tank 33. Operation of the sump pump 112 is controlled by a switch 146. The switch 146 is manually actuated between the ON and OFF positions, and in the ON position during normal operation with a controller controlling the operation of the sump pump 112 depending upon the output of level sensor 33a in the sump tank 33. Just upstream of the pump 112 is disposed an in-line internal strainer, acting much like a pool filter for protecting the pump 112 by preventing large particles from entering the pump inlet. In operation, while the sump pump 112 is pumping water from the holding tank 33 to the electrolytic cell 114, a metering pump 142 injects a conductivity solution from vessel 140 via injector 144. Backflow of fluids toward the holding tank 33 is prevented by a one-way check valve 110 disposed in the piping 22 upstream of injection point of injector 144. The conductivity fluid is essentially a salt brine designed to assist in the electrolytic process at the electrolytic cells 114. A suitable conductivity solution is made by mixing a salt in water. The electrolytic cell 114 is powered by power supply 113a passing a current across the cells resulting in flocculation and coagulation in the waste water. A suitable electrolytic cell 114 is constructed of multiple individual cell plates. The conductivity metering pump 142 is controlled by an on-off switch providing a desired amount of conductivity fluid to the system and in response to a sensor control. The current flow provided by the power supply 113a to the electrolytic cell 114 may be manually controlled or automatically controlled to provide electrical current to the water stream at the electrolytic cell 114.

After passing through the electrolytic cell 114, the wastewater enters a mixer 118 which is preferably one or more in-line static mixers. A suitable static mixer is the series 50 mixer available for TAH Industries Inc., Robbinsville N.J. A second metering pump 132 injects a polymer solution from vessel 130 via injector 134 into the water line between the electrolytic cell 114 and the static mixer 118. In its preferred form, the polymer solution is an organic long-chain high molecular weight emulsion flocculent designed to enhance conglomeration, i.e., enlarge the impurity particles to facilitate removal of particles later in the process. One preferred polymer is the NALCLEAR 7763 polymer flocculent available from Nalco Chemical Products of Naperville, Ill. The actual polymer solution selected will depend upon various factors including the input flow and the expected system impurities being treated by the water treatment system. After passing through the in-line mixer 118, the wastewater is passed through retention tubes 120, 122. This portion of the treatment system is a continuous flow system and the retention tubes 120, 122 are intended to provide sufficient residency and development time (reaction time) for the electrocoagulation and polymer flocculation to operate on the wastewater.

Upon leaving the retention tube 122, the wastewater proceeds via piping 61 into the water tank having three water compartments 60, 70, 80 arranged in a side-by-side, consecutive arrangement disposed within the cabinet 52. Pipe 61 enters the first water compartment 60 and is directed into a swirling cone mixer 62, the cone mixer 62 is a cone-shaped sub-compartment preferable disposed in the first water compartment 60 (for space efficiency reasons but could be located elsewhere). Wastewater entering via the pipe 61 is directed in a centrifugal motion around the cone mixer 62 (due to the cone shape and the tangential inlet direction of the inlet stream from the pipe 61) to create a swirling motion for the water flow. Some of the flocculated material is heavier than the remaining water and passes downward out through the bottom opening of the cone 62 and to the bottom of the first stage water compartment 60. Flocculation material and certain oils that are lighter than the remaining wastewater float to the surface of the first water compartment 60, is removed via oil skimmer or funnel 64, and purged out via piping 66 for recirculation to the sludge separator 32. As shown in FIG. 4, the cone mixer 62 is supported by a bracket 63 between the side walls of the tank compartment 60.

Wastewater from the first water compartment 60 passes through an opening 68 in tank divider 60a and then passes laterally through pipe 72 into the second water compartment 70. The opening 78 is at a mid-level position within the tanks. Heavy particles pass to the bottom of the tank 60 and are purged out through opening 69 into purge pipe 24, while lighter particles floating to the top of the tank are purged out through funnel 64 and purge pipe 66. It is intended that the wastewater at the mid-level of the tank 60 passing through the opening 78 would have the fewest particles. The pipe 72 provides a tortuous path for the "cleaned" wastewater (cleaned wastewater meaning somewhat cleaner wastewater due to the removal of certain particulates, etc. in the first water compartment 60) exiting the first water compartment 60 and entering the second water compartment 70 for further enhancing particle removal. Once in the second water compartment 70, the wastewater is provided with a relatively long residency time to allow for heavier particles and flocculation to settle down into the bottom of the compartment and be purged out of opening 79 into the recycle line 24. Exit pipe 74 is also positioned at mid-level within the tank compartment 70 and has an opening at an opposite side of the tank 70 from the inlet of the pipe 72. Thus the "cleaned" wastewater enters the tank 70 at one lateral side but must exit at the other lateral side. Similar to pipe 72, the pipe 74 provides a tortuous path for the water to pass from compartment 70 out through opening 78 and into the third tank compartment 80. Any heavy particles or heavy flocculation is purged out through the bottom opening 89 into recycle line 24. The flow of sludge water through recycle line 24 is controlled by a control valve 88 and passed to the holding tank 32 and the sludge separator 30. One-way check valves are provided below opening 79 and 89 to prevent backflow of sludge water into the tank 70, 80.

The cleaned wastewater within the third water compartment 80 is recirculated out from the tank via line 92 by pump 152 and through an ozone generator 156, thereby neutralizing bacteria within the water. The ozone pump 152 is controlled via manual switch 154 as permitted by level switch 159 on the tank compartment 80.

At the conclusion of these steps, the water within the tank compartment 80 is recyclable clean water and is pumped out by pump 90 via line 91 for reuse by pressure washer 48.

Since there is some water loss within the system, a fresh water line 158 is controlled by control valve 158a and level switch 157 allows additional water to be injected into the tank compartment 80.

A space heater 170, preferably controlled by a thermostat, is provided within the cabinet structure to provide a desired internal temperature in cold weather climates.

The treatment system 50 is provided with a control panel 165 located behind the doors 53a, 53b. Control panel 165 includes various controllers and gauges for the system, including the sump pump switch 146, the ozone system switch 154, the tank purge switch 167, and the electrolytic cell check light 169. When the sump pump 112 is running, the amperage gauge 172 will normally have an expected reading. For example, the operator may make the necessary adjustments on the amperage potentiometer 113 to provide a desired amperage reading on the gauge 172 corresponding to the electrolytic cell 114. The control panel 165 also includes a cell voltage gauge 174 to visually monitor cell condition, a cell check light 169 to visually identify cell depletion, a voltage light 178 to show that electrical is connected, and a run-time meter 176 to indicate hours of run time for electric cell. The pressure washer is preferably provided with a time-delay shutdown mechanism that turns off the pressure washer if too much time has elapsed since the trigger gun was activated, such as when the operator walks away without turning it off.

An example operation at first use by the following steps may comprise the steps of:

Adding a five-gallon container 130 with the polymer solution, inserting pump tubing into the container and setting a control dial on the pump 132 to a desired position;

Mixing the desired conductivity fluid solution within the tank 140, inserting pump tubing into the tank 140 and setting the controller on the pump 142 to the desired position;

Connecting electrical power to the control panel 165;

Connecting fresh water supply 100 to connection 102 wherein control valve 158a will cause compartments 80, 70, and 60 to automatically fill to proper levels;

Priming the sump pump 112 as needed by connecting freshwater 100 to connection 102a;

Turning on the various systems from the control panel 165, including the sump pump switch 146, the ozone system switch 154, the conductivity solution pump 142 and the polymer pump 132.

Though the present invention has been set forth in the form of its preferred embodiments, it is nevertheless intended that modifications to the disclosed systems and methods may be made without departing from inventive concepts set forth herein.

The invention claimed is:

1. A treatment system for wash fluid treatment and recycling, comprising:
   a treatment system inlet providing an incoming fluid stream;
   an inline electrolytic coagulation system comprising one or more electrolytic cells for treating the fluid stream;
   a polymer injection system for injecting a polymer solution into the fluid stream;
   a separation system for separating particulates from the fluid stream; a line for recycling separated fluid stream from said separation system to a washing system; and a sump comprising a sludge tank/separator and a trench section separated by a weir; a hose or pipe for transferring wash fluid to said sludge tank/separator for separating solids from the wash fluid; a line for purging sludge from said separation system to said sludge tank/separator; wherein said sludge tank/separator contains a fabric filter disposed on a filter screen for removing sludge from said sludge tank/separator, and filtered wastewater passing through said filter screen passes over said weir into said trench section to provide said incoming fluid stream for said treatment system inlet.

2. A treatment system according to claim 1 wherein the separation system comprises a multi-stage system including a plurality of water separation compartments for consecutively separating particulates from the fluid stream.

3. A treatment system according to claim 1 further comprising:
   a conductivity fluid injection system for injecting a conductivity fluid into the fluid stream upstream of the electrolytic coagulation system.

4. A treatment system according to claim 1 further comprising:
   an inline static mixer section positioned between the polymer injection system and the separation system for mixing the injected polymer solution with the fluid stream.

5. A treatment system according to claim 4 further comprising:
   a fluid retention system comprised of a plurality of retention tubes disposed between the static mixer section and the separation system for providing residency time for polymer solution to react with the fluid stream.

6. A treatment system according to claim 1 further comprising:
   an ozone treatment system including an ozone generator, wherein water from the separation system is circulated through the ozone treatment system for further purification.

7. A treatment system according to any of claims 2-6 further comprising an enclosure, the system being enclosed by the enclosure.

8. A treatment system according to claim 7 further comprising a heater for providing a desired internal temperature within the enclosure.

9. A treatment system according to claim 7 wherein the enclosure comprises a cabinet having doors and a plurality of removable panels.

10. A treatment system according to claim 1 further comprising:
    a wash pad for collecting wash fluids from an item being washed;
    wherein said sump accepts the wash fluids from the wash pad.

11. A treatment system according to claim 1 wherein the polymer solution is an organic long-chain high molecular weight emulsion flocculent.

12. A treatment system for wash fluid treatment and recycling;
    comprising:
    a treatment system inlet providing an incoming fluid stream;
    a cabinet enclosure for containing the treatment system;
    a separation system for separating particulates from the fluid stream comprising a multi-stage system including
    a cone-shaped compartment having a skimmer, a lower outlet, and an inlet for accepting the inlet fluid stream tangentially to create a swirling motion;
    a first, second and third water separation compartments disposed in the cabinet enclosure and arranged consecutively, the first water separation compartment being connected to the lower outlet of the cone-shaped compartment, the second water separation compartment being connected to the first water separation compartment, and the third water separation compartment being connected to the second water separation compartment, wherein the water separation compartments are operable for consecutively separating particulates from the fluid stream as the fluid stream travels from the first water separation compartment to the second water separation compartment and then to the third water separation compartment a line for recycling separated fluid stream from said separation system to a washing system; and a sump comprising a sludge tank/separator and a trench section separated by a weir; a hose or pipe for transferring wash fluid to said sludge tank/separator for separating solids from the wash fluid; a line for purging sludge from said separation system to said sludge tank/separator; wherein said sludge tank/separator contains a fabric filter disposed on a filter screen for removing sludge from said sludge tank/separator, and filtered wastewater passing through said filter screen passes over said weir into said trench section to provide said incoming fluid stream for said treatment system inlet.

* * * * *